United States Patent
Odamura

(10) Patent No.: US 6,941,354 B2
(45) Date of Patent: Sep. 6, 2005

(54) MOBILE TERMINAL PERMITTING SELECTION OF COMMUNICATION CHANNEL FOR RECEIVING MESSAGE ATTACHMENTS

(75) Inventor: Satoshi Odamura, Tokyo (JP)

(73) Assignee: NEC Corporation, Tokyo (JP)

( * ) Notice: Subject to any disclaimer, the term of this patent is extended or adjusted under 35 U.S.C. 154(b) by 607 days.

(21) Appl. No.: 09/845,309

(22) Filed: May 1, 2001

(65) Prior Publication Data

US 2001/0039194 A1 Nov. 8, 2001

(30) Foreign Application Priority Data

May 8, 2000 (JP) ........................................ 2000-134666

(51) Int. Cl.[7] .............................................. G06F 13/00
(52) U.S. Cl. ...................... 709/219; 709/206; 709/229; 709/250
(58) Field of Search ................................ 709/203, 206, 709/217, 219, 229, 250; 719/311, 313, 328, 329

(56) References Cited

U.S. PATENT DOCUMENTS

| | | | | |
|---|---|---|---|---|
| 6,035,104 A | * | 3/2000 | Zahariev | 709/203 |
| 6,138,158 A | * | 10/2000 | Boyle et al. | 709/225 |
| 6,256,666 B1 | * | 7/2001 | Singhal | 709/217 |
| 6,275,850 B1 | * | 8/2001 | Beyda et al. | 709/206 |
| 6,301,245 B1 | * | 10/2001 | Luzeski et al. | 370/352 |
| 6,351,523 B1 | * | 2/2002 | Detlef | 379/88.14 |
| 6,598,076 B1 | * | 7/2003 | Chang et al. | 709/206 |
| 6,636,733 B1 | * | 10/2003 | Helferich | 455/412.2 |
| 6,687,745 B1 | * | 2/2004 | Franco et al. | 709/219 |

FOREIGN PATENT DOCUMENTS

| | | |
|---|---|---|
| JP | 10-190845 | 7/1998 |
| JP | 10-294962 | 11/1998 |
| JP | 11-32378 | 2/1999 |
| JP | 11-113061 | 4/1999 |
| JP | 11-275143 | 10/1999 |
| JP | 11-313074 | 11/1999 |

OTHER PUBLICATIONS

United Kingdom Search Report dated Dec. 6, 2001.
Japanese Office Action dated Feb. 17, 2004 with Partial English Translation.

* cited by examiner

Primary Examiner—Viet D. Vu
(74) Attorney, Agent, or Firm—McGinn & Gibb, PLLC

(57) ABSTRACT

There is provided a mobile terminal capable of properly selecting a communication network according to a kind of data targeted for sending and receiving when data is sent and received using a network. A mobile terminal 201 makes access to a WWW server 223 to acquire contents, and uses a packet communication gateway 225 to first acquire HTML data (main data) of the corresponding contents at the time of display. A tag for referring to various files (accompanying data) such as JPEG constructing the contents is embedded in this HTML data. Therefore, the mobile terminal 201 requests sizes of these files to the WWW server 223 by packet communication, and determines whether these files are acquired by packet communication or by line switching from the acquired file size. If these files are acquired by the line switching, the files are acquired from the WWW server 223 by using a line switching gateway 226 and making connection to an Internet network 222 through a public network 228, an Internet provider 229. By selecting a communication channel according to the files thus, economical communication or speedy communication is ensured. Also, with regard to receiving of electronic mail, a line can be selected similarly.

16 Claims, 9 Drawing Sheets

MOBILE TERMINAL PERMITTING SELECTION OF COMMUNICATION CHANNEL FOR RECEIVING MESSAGE ATTACHMENTS

BACKGROUND OF THE INVENTION

1. Field of the Invention

The present invention relates to a mobile terminal for making connections to a network such as the Internet using wireless, and particularly to a mobile terminal, such as mobile phone including automobile telephone or PTS (Private Telephone Service), for making access to various files.

2. Description of Related Art

A mobile terminal such as mobile phone, PTS has widely been used by virtue of its ease as well as a computer for making connections to a network through wire, and recently, the practice of making access to the Internet to receive information on a home page or exchange electronic mail has been performed ordinarily.

With regard to accounting as a network usage charge of the case of using such a mobile terminal to use a network, any one of two methods has been adopted conventionally. One method is to settle the accounting according to the amount of data when data is sent and received through the network. For example, in packet communication, when predetermined information about a dissertation etc. consisting of text information is read by one page, data is sent and received as a packet every page turning, but in the case other than the reading, no load is imposed on a network. Hence, in such a case, it is rational to settle the accounting according to the amount of data sent and received. The other method is to settle the accounting according to time during connection to a network. This method has widely been used in accounting for telephone etc. conventionally, and offers the advantage in the case that the amount of data sent and received every unit time is large.

An administrator of each the network attempts to settle the accounting based on any one of the methods by a contract with a user or by oneself. Thus, the user can conduct economical communications by selecting the network according to a form of the use.

In a technique described in JP H10-190845 A, it is constructed so as to prepare a table for controlling a communication charge etc. per unit time under the circumstances that a mobile terminal is connected to a server through several kinds of mobile communication networks. Then, it is constructed so that the minimum communication time or the minimum communication charge is estimated using this table before starting communication and according to this estimation, a user can determine the optimum mobile communication network to start the communication.

Also, in a technique of JP H11-313074 A, it is constructed so that at the time when data communication is started between a client machine and a server machine and sending of unit data is completed, based on information about a throughput of the case of using another server machine, processing time necessary for the case of switching a line to this server machine to conduct data communication from the beginning is calculated. Then, it is constructed so as to reduce the communication time by again conducting communication by the latter server machine if it is determined that more efficient communication can be conducted to again conduct data communication from the beginning using the server machine other than the server machine by which the communication has been conducted presently.

However, these two techniques assume that information sent and received is one kind. Therefore, it cannot cope well with the case that the information sent and received is formed of several files with respectively different characteristics. For example, when access is made to contents (home page) on a server, various files or data such as text information described by HTML (Hypertext Markup Language), JPEG (Joint Photographic Experts Group), MPEG (Moving Picture Experts Group), etc. are present in the contents. When an attempt is made to receive mail, various files or data may be attached to the mail similarly. In a technique of JP H11-113061 A, an idea of speedily conducting data communication in which plural data are mixed is performed.

FIG. 9 shows a technique for sending and receiving plural data disclosed in this publication. First, a communication channel with a communication destination is established to become a data communication state (step S101). In this state, a kind of data of the first target of communication present in the head of data storage means for storing data to be sent is detected by data kind detection means (step S102). Then, a protocol corresponding to the data is selected by protocol selection means (step S103) and data communication about the data is conducted using the protocol (step S104). Thereafter, it is checked whether unsent data is present in the storage means or not (step S105) and if so (Y), the communication destination is notified of switching of the protocol (step S106), and the kind of the next data is detected (step S102) and data communication is conducted by a protocol corresponding to this (steps S103, S104). The similar operations are performed below.

Also, in a technique of JP H11-32378 A, a proposition to improve the point that an information channel TCH of two channels provided between a mobile phone and a base station has conventionally been used in only voice communication or only data communication is made. In this proposition, it is constructed so as to measure the amount of transfer data when a need to conduct data communication during voice communication arises. Then, after always ensuring an information channel TCH of one channel for voice communication, it is constructed so as to select the proper channel for data communication from low-speed accompanying channels or high-speed accompanying channels based on the amount of data measured.

However, in the technique described in JP H11-113061 A shown in FIG. 9, a kind of communication data is determined in a state in which communication networks are established and according to the kind, a protocol with the communication destination is switched. Thus, while there is a merit that data communication is conducted more efficiently by the switching of the protocol, a method of data transfer is selected only within a range of the established communication networks and efficient communication cannot be conducted in case that the selected communication networks are inadequate. Therefore, there was a problem that even when efficient communication was conducted within the connected communication networks, there is a possibility that a communication charge becomes lower if other communication networks are used.

Also in the technique described in JP H11-32378 A, this point is similar. Further, in this technique, it is constructed so as to always ensure the information channel TCH of one channel for voice communication. Therefore, for example, even if the voice communication is unnecessary, one channel is ensured for voice communication so as to receive electronic mail to which a file is attached, so that there was a problem that one channel becomes a free channel entirely and efficient use of the connected communication networks cannot be made.

SUMMARY OF THE INVENTION

Therefore, an object of the invention is to provide a mobile terminal capable of properly selecting a communication network according to a kind of data targeted for sending and receiving when data is sent and received using a network.

According to the first aspect of the present invention, there is provided a mobile terminal characterized by comprising receiving means for receiving main data in which information about accompanying data accompanying the main data is written together and one or more accompanying data accompanying the main data through a wireless line, the receiving means comprising: main data acquisition means for acquiring the main data through a predetermined communication channel, individual accompanying data communication channel determination means for determining a communication channel suitable for receiving individual accompanying data according to the information about the accompanying data written together in the main data acquired by said main data acquisition means, and communication channel selection means for selecting the communication channel determined by said individual accompanying data communication channel determination means for receiving the accompanying data The individual accompanying data communication channel determination means may determine a communication channel according to the amount of data of the accompanying data. The amount of data of the accompanying data can use the amount of data directly when the amount of data is indicated in the main data and can be estimated from a kind of the accompanying data when the amount of data is not indicated in the main data.

It may be preferable that a communication channel is selected by the individual accompanying data communication channel determination means on the basis of the fact that communication time becomes short, but the communication channel may be selected on the basis of economy or reliability.

The main data may be described by a page description language (PDL) such as HTML (Hypertext Markup Language) or XML (eXtensible Markup Language) and may be data indicating a text body of electronic mail. For the main data of the former, the accompanying data is various configuration files of contents such as image, video or voice, and specifically, JPEG (Joint Photographic Experts Group) or MPEG (Moving Picture Experts Group). Also, for the main data of the latter, the accompanying data is various attached files such as image, video or voice.

The present invention can be extended to not only receiving of information contents or electronic mail but also sending of data accompanied by accompanying data, for example, sending of electronic mail accompanied by attached files. That is, according to a second aspect of the present invention, there is provided a mobile terminal characterized by comprising sending and receiving means for sending and receiving main data in which information about accompanying data accompanying the main data is written together and one or more accompanying data accompanying the main data through a wireless line, the sending and receiving means comprising: main data communication channel selection means for selecting a communication channel predetermined as a communication channel for sending and receiving the main data, individual accompanying data communication channel determination means for determining a communication channel suitable for communication of individual accompanying data according to the information about the accompanying data written together in the main data, and accompanying data communication channel selection means for sequentially selecting the communication channel determined by said individual accompanying data communication channel determination means.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
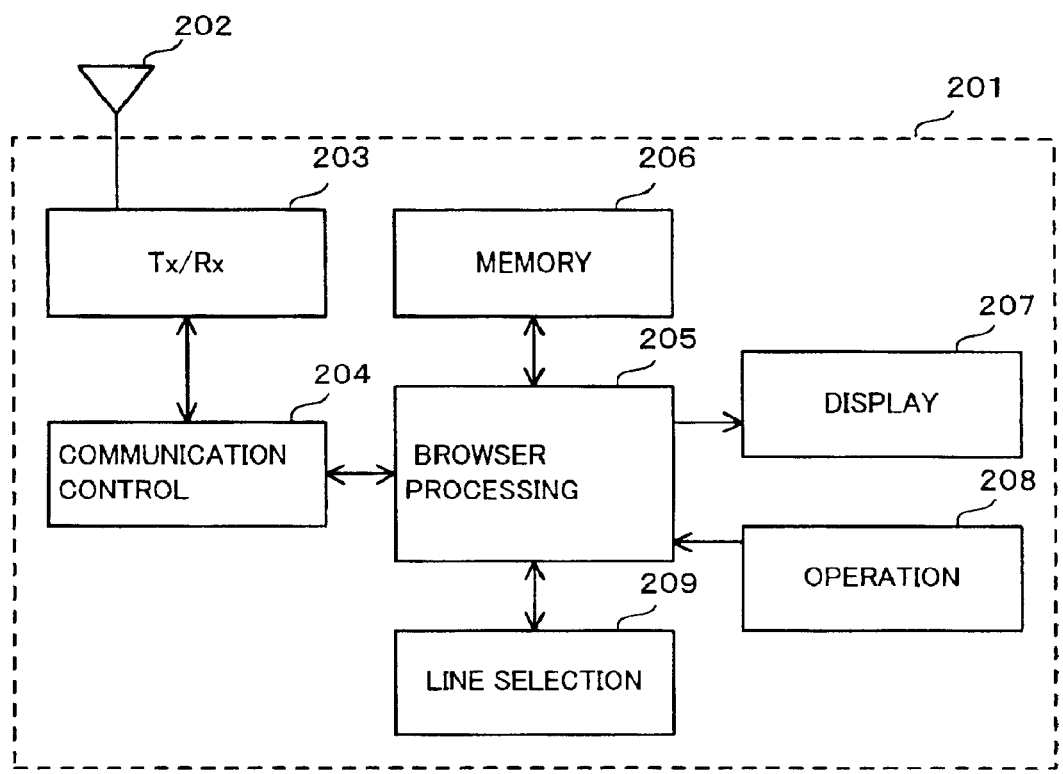
FIG. 1 is a block diagram showing a configuration of a mobile terminal of an embodiment of the present invention.

FIG. 1 shows a configuration of a mobile terminal of an embodiment of the present invention. This mobile terminal 201 provides an antenna 202 for transmitting and receiving data through an antenna. A transmitter and receiver 203 is constructed so as to demodulate receive data received through the antenna 202 or modulate send data to output the data from the antenna 202. A communication control part 204 is constructed so as to process respective protocols of packet communication and line switching data communication. A browser processing part 205 provides a CPU (central processing unit) which is not shown. The browser processing part 205 is connected to memory 206, a display part 207, an operation part 208 and a line selection part 209 in addition to the communication control part 204, and is constructed so as to perform a central function of control by executing a program stored in the memory 206. Here, the display part 207 is made of a liquid crystal display and is constructed so that characters or images can be displayed. The operation part 208 is formed by placing plural keys for performing dialing or various inputs. The line selection part 209 provides a function of selecting a communication channel in the case of connecting this mobile terminal 201 to a wireless network.

Figure 2:
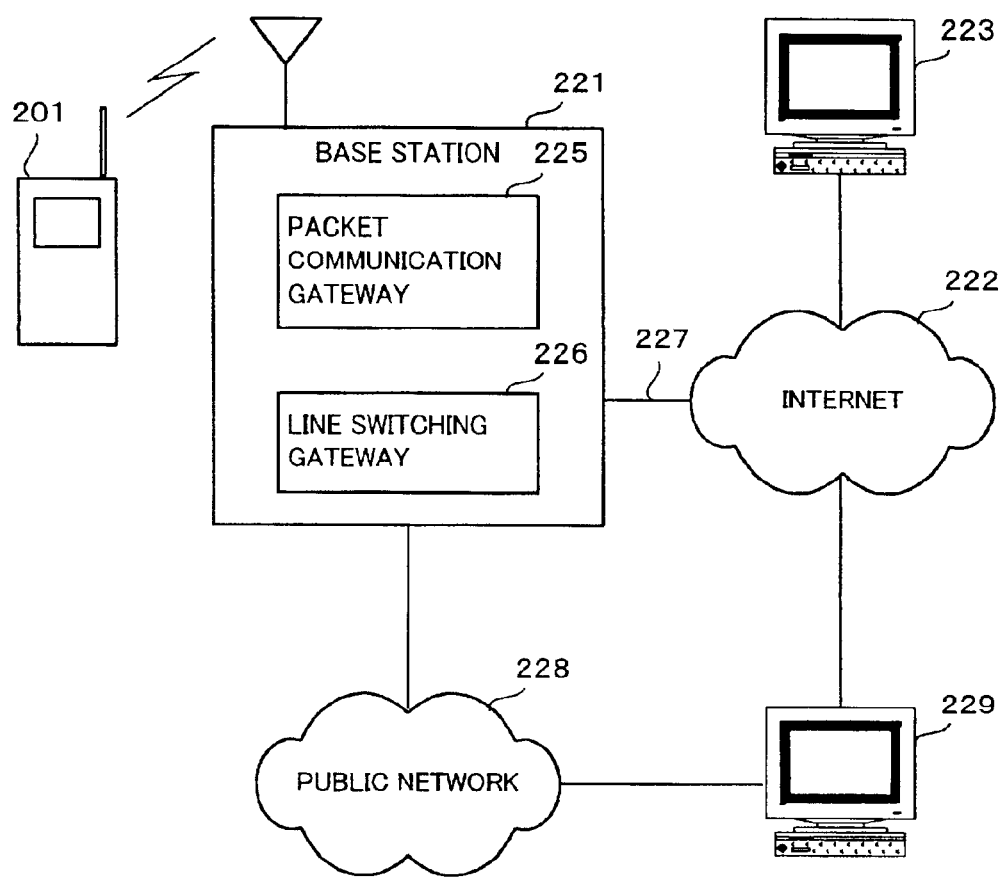
FIG. 2 is a system configuration diagram showing a summary of a communication system using the mobile terminal of the present embodiment.

FIG. 2 shows a summary of a communication system using the mobile terminal of the present embodiment. The mobile terminal 201 of the present embodiment is constructed so that a connection can be made to a WWW (world wide web) server 223 on an Internet network 222 through a base station 221. In the present embodiment, the base station 221 provides two gateways of a packet communication gateway 225 and a line switching gateway 226. Here, the packet communication gateway 225 is connected to the Internet network 222 through a communication channel 227 for packet communication and is provided in order to send and receive data by conducting packet communication with the WWW server 223. On the contrary, the line switching gateway 226 is constructed so as to conduct communication with the WWW server 223 by being connected to a public network 228 and connected to the Internet network 222 through an Internet provider 229 acting as an Internet access provider.

Figure 3:
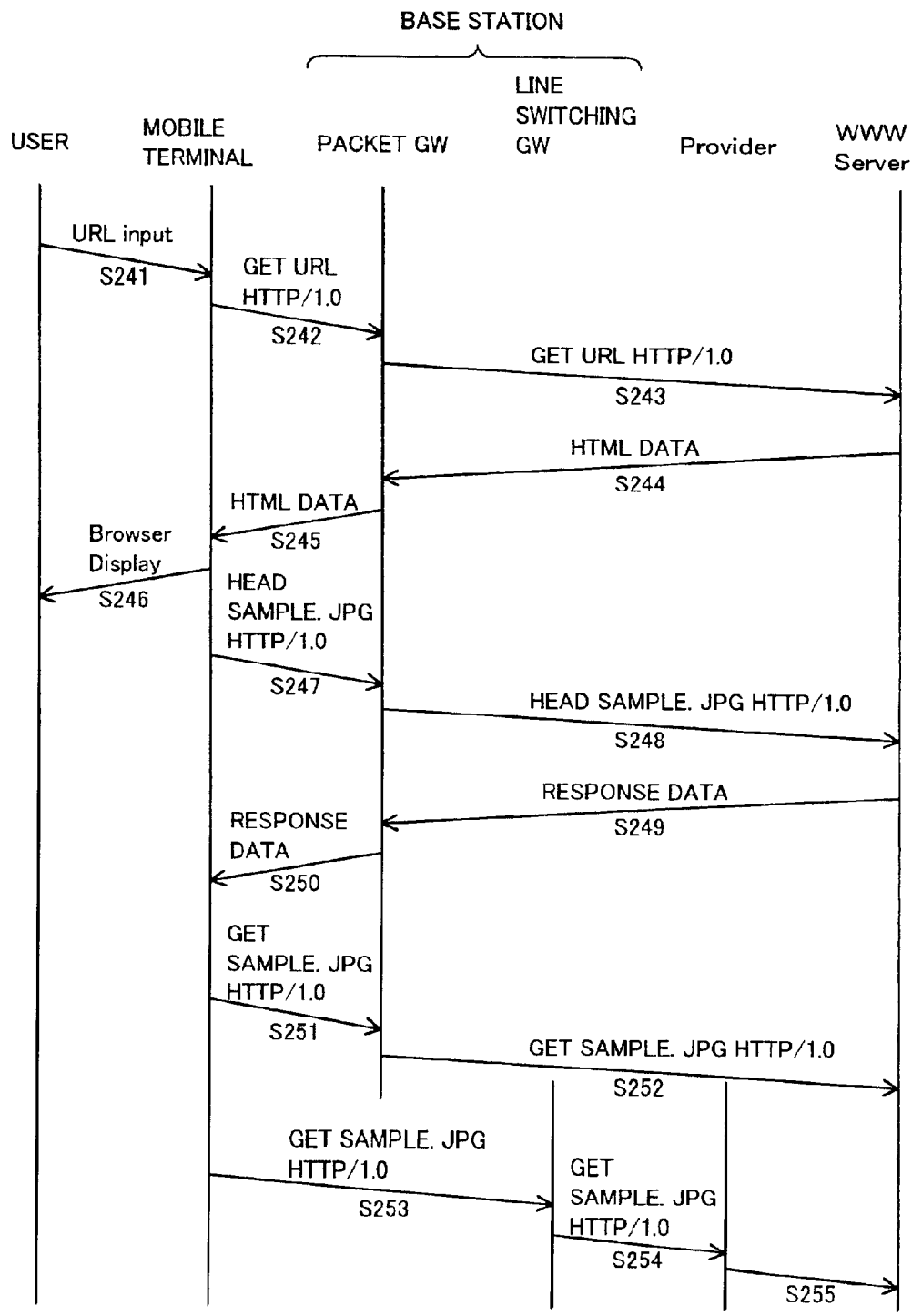
FIG. 3 is an illustration showing a flow of processing in the case of making access to a home page on the Internet to download a desired page using the mobile terminal of the present embodiment.

FIG. 3 shows a flow of processing in the case of making access to a home page (contents) on the Internet to download a desired page using the mobile terminal of the present embodiment. As an assumption of this processing, the mobile terminal 201 is registered in the base station 221 shown in FIG. 2 and is initially connected to a packet communication network. A user of the mobile terminal 201 inputs a URL (Uniform Resource Locator) of the home page to make access from the operation part 208 (step S241). Then, the above-mentioned CPU of the browser processing part 205 of the mobile terminal 201 outputs this inputted URL to the transmitter and receiver 203 through the communication control part 204. The transmitter and receiver 203 modulates the inputted URL and sends the URL from the antenna 202 toward the base station 221 as a request (GET URL HTTP/1.0) of a HTTP (Hyper Text Transfer Protocol) (step S242).

This request sent from the mobile terminal 201 is inputted to the packet communication gateway 225 of the base station 221, and is sent to the Internet network 222 through the communication channel 227 for packet communication, and the WWW server 223 having the corresponding URL receives this request (step S243). The WWW server 223 receiving the request sends HTML data describing the URL to the Internet network 222 and the data is sent to the base station 221 through the communication channel 227 for packet communication as packet data (step S244).

Figure 4:
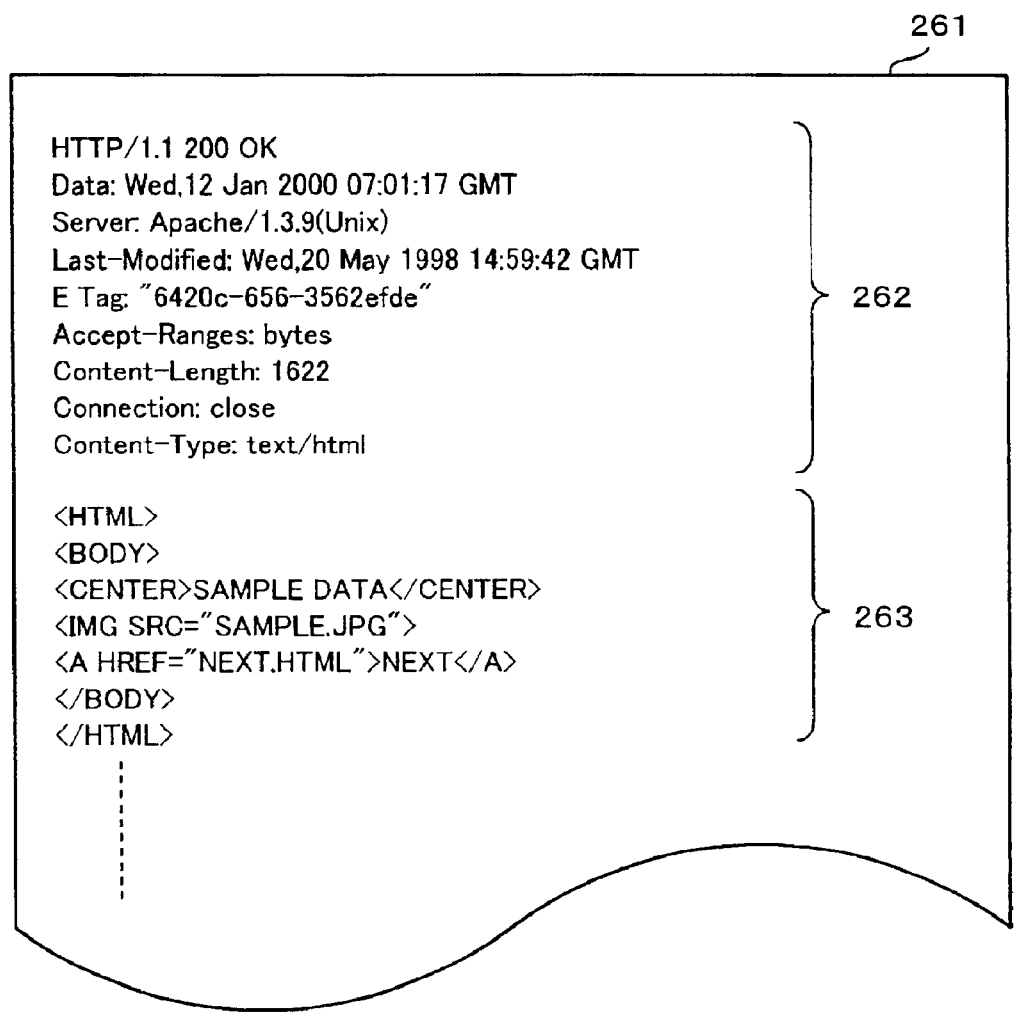
FIG. 4 is an illustration showing a part of a configuration of HTML data sent from a WWW server to a base station in the present embodiment.

FIG. 4 shows a part of a configuration of the HTML data sent from the WWW server to the base station at this time. HTML data 261 is divided into a header 262 and an HTML text body 263. They are formed of information with a relatively small amount of data as a description language. That is, HTML is one kind of embedded language and is formed as a document into which instructions of the language or tags are inserted. Multimedia data of images such as static image, time-varying image, or voice, etc. appearing on a home page is different from the HTML document, and tags for reference are respectively embedded into the HTML text body 263. For example, "SAMPLE.JPEG" shown in FIG. 4 is image data with a file format referred to as JPEG and this is stored in a predetermined storage region of the WWW server 223 as another file. In the HTML document, a kind and a name of such files are defined and by separately downloading these files to integrate them, the corresponding page of the home page is displayed or a voice is outputted on the page. In the first stage in which a user specifies a desired URL and specifies the corresponding contents, the HTML data 261 consisting of the header 262 and the HTML text body 263 as shown in FIG. 4 is only sent to the mobile terminal 201, and files of images etc. referred to by tags are still not sent to the mobile terminal 201.

In the mobile terminal 201 which has received the HTML data 261 as shown in FIG. 4, the above-mentioned CPU within the browser processing part 205 analyzes this syntax. Display image data created as a result of this analysis is sent to the display part 207 and is displayed. In this example, only text information is displayed on the display part 207 acting as a display in a state in which a display area of "SAMPLE.JPEG" is still a blank frame.

Figure 5:
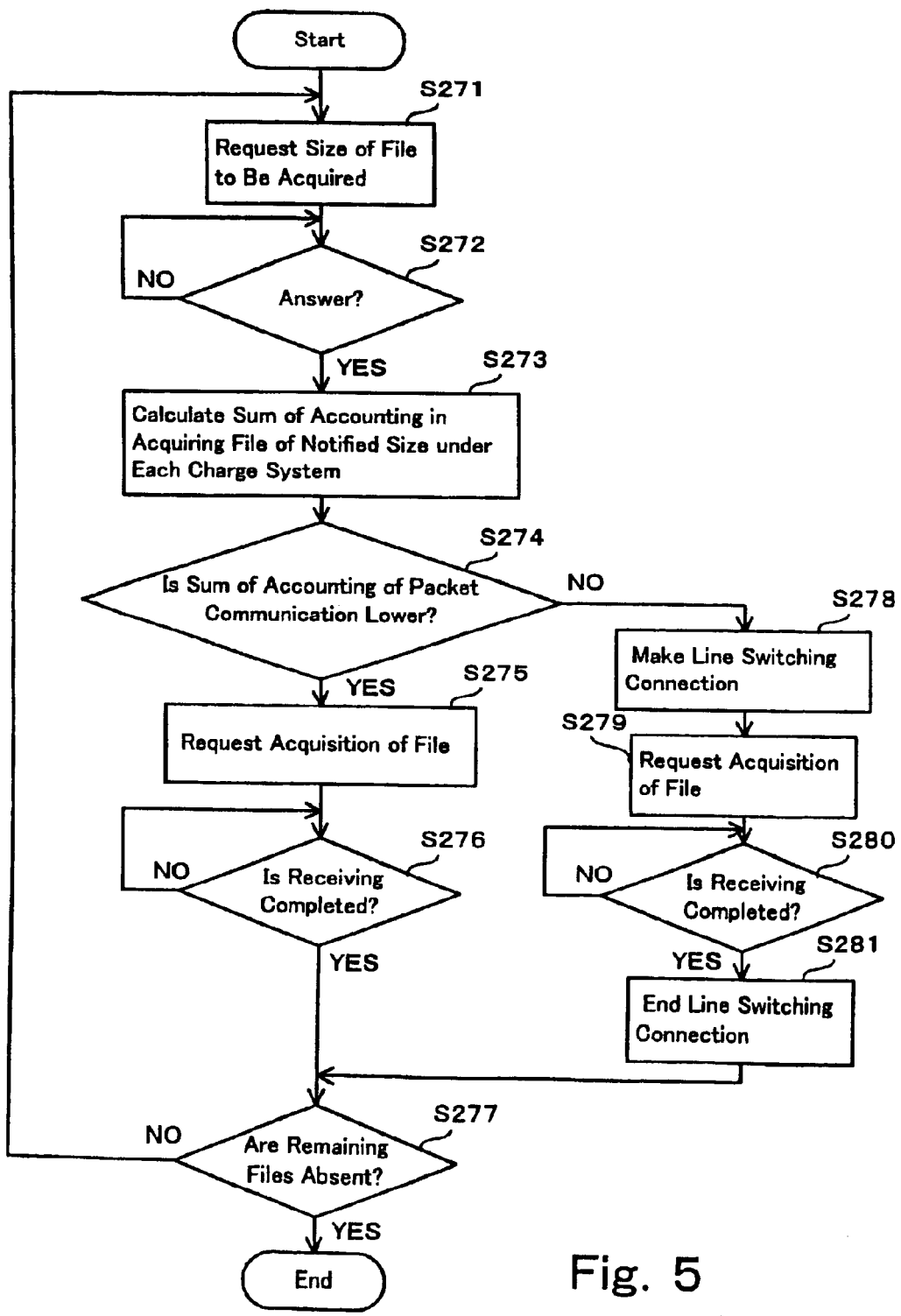
FIG. 5 is a flowchart showing a flow of processing in which a CPU within a browser processing part acquires a file referred to by a tag in the present embodiment.

FIG. 5 shows a flow of processing in which the CPU within the browser processing part acquires a file referred to by a tag. The CPU requests the size of a file to be next acquired of files indicated by the tag with respect to the WWW server 223 (step S271). When an answer to this request returns from the WWW server 223 (step S272: Y), a sum of accounting necessary to acquire the corresponding file of the size notified by this answer is individually calculated under two charge systems by packet communication and line switching connection (step S273). For the charge system by packet communication, a sum of accounting is calculated by the amount of data of the number of packets. For the charge system by line switching connection, a sum of accounting is calculated on the basis of a charge per time and time to acquire data of the amount of notified data tempered with time for making connection to the Internet network 222 through the Internet provider 229. When the amount of data transfer depends on a time zone or a day, calculation may be made using statistics previously obtained with relation to the time zone or the day to acquire a file. In the case of making access to the Internet network 222 in the relatively close time zone of the same day, time necessary to acquire data is calculated with reference to the value and based on this time, a sum of accounting may be calculated. In the case of acquiring various files of the same home page, this technique can be adopted with regard to the files after the second file.

Figure 6:
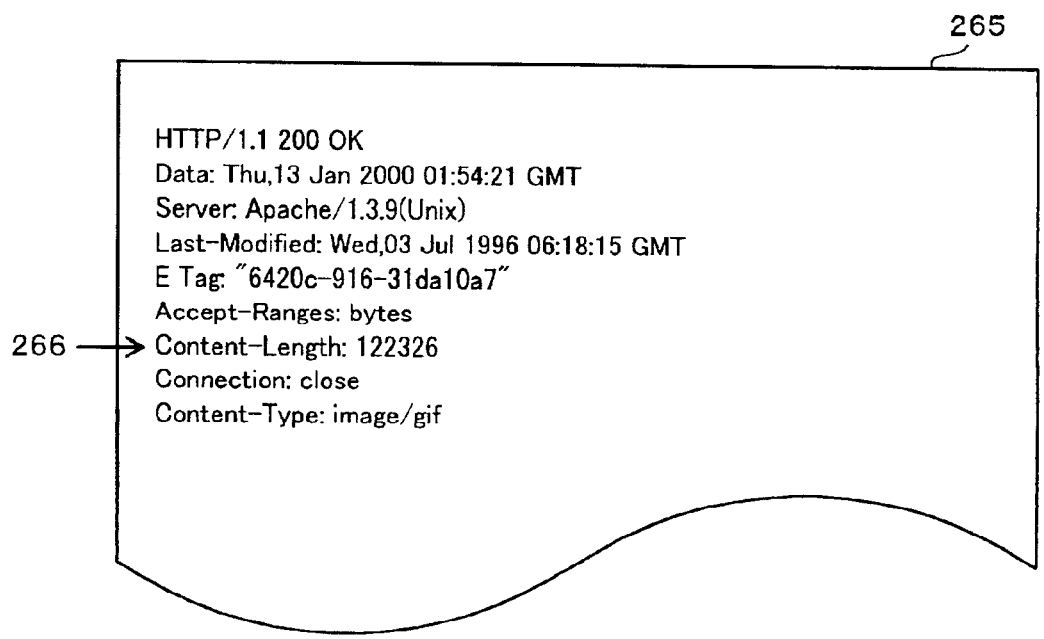
FIG. 6 is an illustration showing one example of an answer to a size of a file from the WWW server in the present embodiment.

FIG. 6 shows one example of an answer to a size of a file from the WWW server. A portion 266 of "Content. Length: 122326" of this answer statement 265 indicates a size of a file. This example indicates that a size of the file is 122326 (bytes).

A sum of accounting is respectively calculated under the two charge systems based on a size of the corresponding file and the results are compared and if it is determined that a sum of accounting of packet communication is lower (step S274: Y), acquisition of the corresponding file is requested while maintaining the present packet communication (step S275). Then, when receiving of this file is completed (step S276: Y), it is determined whether the remaining files to be acquired with regard to the contents become absent or not (step S277) and if the remaining files are still present (N), an operation again returns to step S271 and a notification of the size is requested in order to acquire the next file. If all the files with regard to the contents have been acquired (step S277: Y), the processing is ended (End).

On the other hand, in step S274, if it is determined that a sum of accounting of the packet communication is not lower, namely a sum of accounting of the line switching connection is more advantageous (N), the base station 221 makes line switching connection (step S278). However, since the method of the packet communication does not receive data during the line switching connection, the accounting is not settled, so that data is kept in a state of not receiving. In this stage, the line switching gateway 226 is connected to the public network 228 and is connected to the Internet network 222 through the Internet provider 229 and sending of the corresponding file is requested to the WWW server 223 (step S279). The CPU monitors the completion of receiving the file and if the receiving is completed (step S280: Y), the line switching connection is once ended (step S281: Y) and an operation proceeds to step S277. The similar operations are performed below.

Returning to FIG. 3, the above processing will be described. When the base station 221 receives HTML data describing URL from the WWW server 223, the base station 221 transmits this data to the mobile terminal 201 by wireless (step S245). As a result of this, a user can view a home page in a state in which files such as JPEG are not still reproduced by a browser (step S246). In this state, a request of a file size of "SAMPLE.JPEG" in the HTML text body 263 shown in FIG. 4 is outputted (step S247). This request is sent from the packet communication gateway 225 of the base station 221 to the Internet network 222 through the communication channel 227 for packet communication and reaches the WWW server 223 (step S248). The WWW server 223 gives an answer of the file size of "SAMPLE.JPEG" to this (steps S249, S250). Based on the obtained size information, the mobile terminal 201 determines whether the file of "SAMPLE.JPEG" is acquired by packet communication or by line switching data communication.

If it is determined that a method of the packet communication is economical more, acquisition of the file of "SAMPLE.JPEG" is requested from the mobile terminal 201 to the WWW server 223 through the packet communication gateway 225 (steps S251, S252). On the other hand, if it is determined that a method of the line switching data communication is economical more, acquisition of the file of "SAMPLE.JPEG" is requested from the mobile terminal 201 to the WWW server 223 through the line switching gateway 226, the public network 228, the Internet provider 229 (steps S253, S255).

Modified Possibility of Invention

Figure 7:
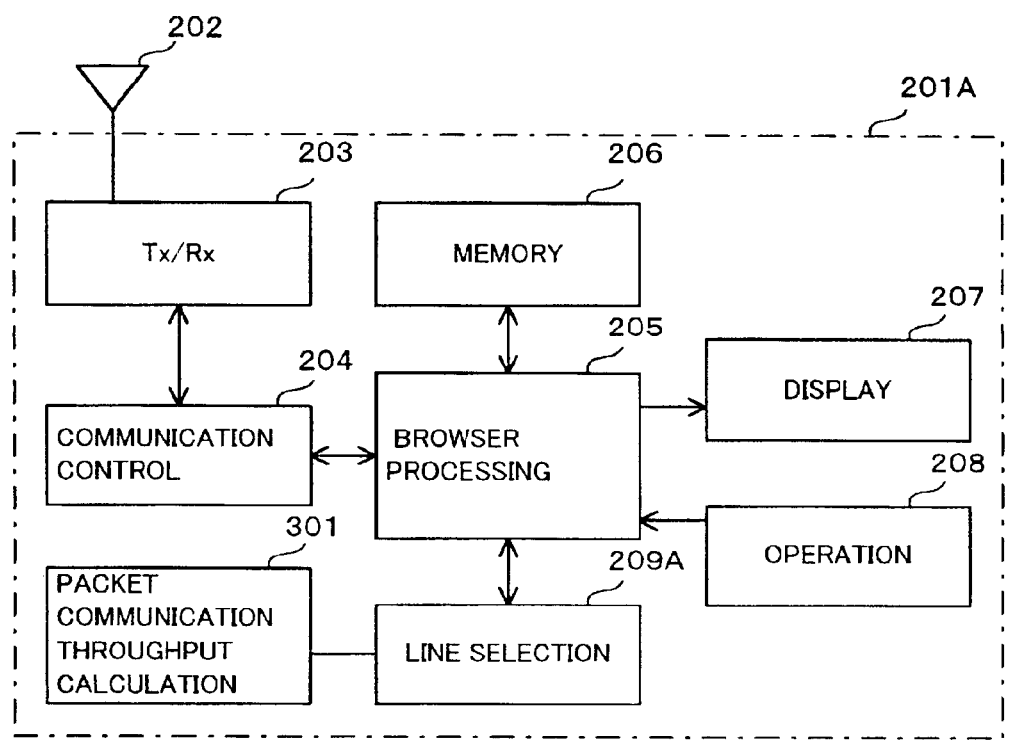
FIG. 7 is a block diagram showing a configuration of a mobile terminal in a modified example of the present invention.

FIG. 7 shows a configuration of a mobile terminal in a modified example of the present invention. In this FIG. 7, like reference signs are attached to the same portions as FIG. 1 of the previous embodiment, and these descriptions are omitted properly. In a mobile terminal 201A of this modified example, a packet communication throughput calculation part 301 is provided newly. The packet communication throughput calculation part 301 is constructed so as to calculate time necessary to acquire the HTML data 261 in the previous embodiment and processing time (throughput) in packet communication from the amount of data acquired. In the case of conducting the packet communication, when terminals connected to a network increase, a band per one terminal decreases and the situation in which a throughput decreases occurs. Because of this, in this modified example, it is constructed so that the packet communication is not selected by only a sum of accounting and a communication channel capable of using data in a short time is selected.

Figure 8:
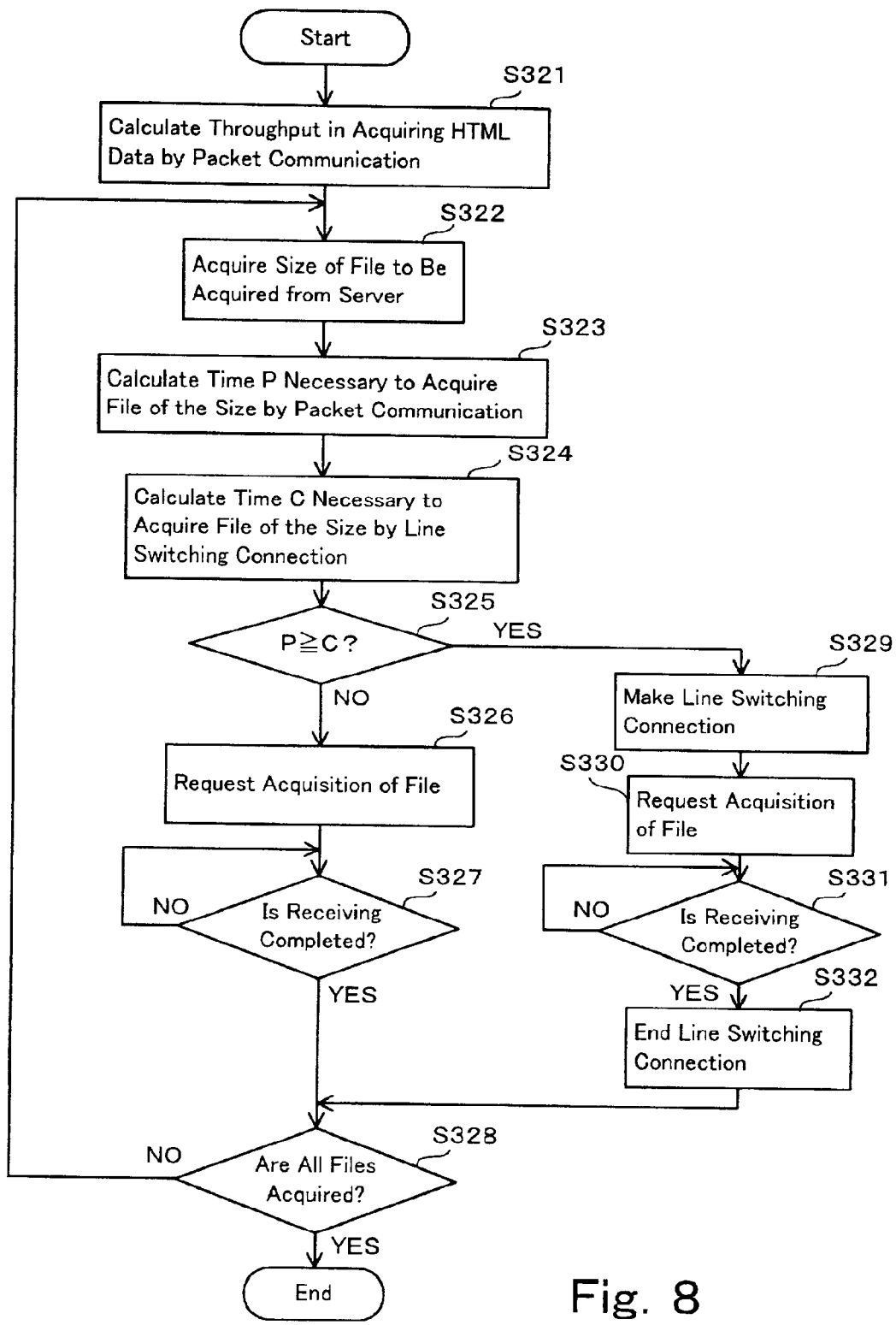
FIG. 8 is a flowchart showing a flow of processing in the case of acquiring a file in the modified example.
Figure 9:
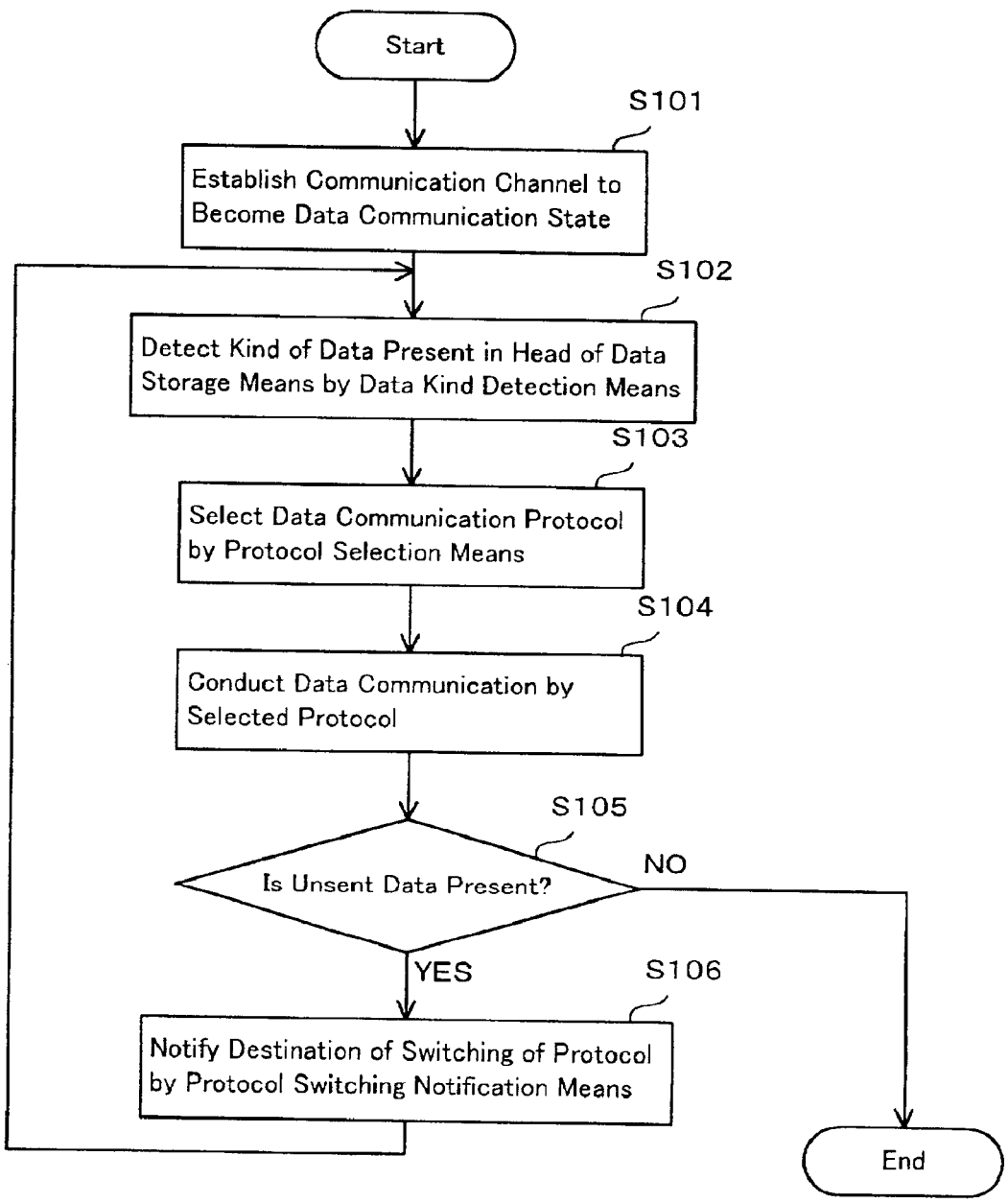
FIG. 9 is a flowchart showing a conventional technique for sending and receiving plural data.

FIG. 8 shows a flow of processing in the case of acquiring a file in this modified example. First, the packet communication throughput calculation part 301 calculates a throughput of the packet communication performed just previously from the amount of data of the HTML data 261 shown in FIG. 4 and required time in acquiring this data (step S321). Next, a size of a file to be acquired in a manner similar to that described in step S271 of FIG. 5 is requested with respect to the WWW server 223 (step S322). When the WWW server 223 gives an answer of a size of the file to this request, time P necessary to acquire the corresponding file by packet communication is predicted using the throughput calculated in step S321 (step S323). Then, the packet communication throughput calculation part 301 predicts processing time C necessary to acquire a file of the size by line switching connection with reference to a result of the line switching connection processed in the same or closer past time zone of the browser processing part 205 etc. (step S324). Thereafter, the packet communication throughput calculation part 301 compares the two values P, C (step S325).

As a result of this, if it is determined that the value C is larger (N), namely the time necessary to acquire the packet by the packet communication is shorter, the file is acquired from the WWW server 223 by the packet communication using the packet communication gateway 225 (step S326). When the acquisition is completed (step S327: Y), it is determined whether all the files for reproducing the corresponding contents are acquired or not (step S328) and if the remaining files are present (N), an operation proceeds to step S322 and processing of acquiring the next file is started. On the contrary, if the acquisition of all the files is completed (step S328: Y), the acquisition processing of the accompanying file is ended (End).

On the other hand, in step S325, if it is determined that the value P is larger than or equal to the value C (Y), line switching connection is made in a manner similar to that described in step S278 (step S329). However, since the method of the packet communication does not receive data during the line switching connection, the accounting is not settled, so that data is kept in a state of not receiving. In this stage, the line switching gateway 226 is connected to the public network 228 and is connected to the Internet network 222 through the Internet provider 229 and sending of the corresponding file is requested to the WWW server 223 (step S330). The above-mentioned CPU monitors the completion of receiving the file and if the receiving is completed (step S331: Y), the line switching connection is once ended (step S332) and an operation proceeds to step S328. The similar operations are performed below.

Incidentally, in the embodiment or the modified example described above, it is constructed so as to break a dial-up connection when acquisition of one file is completed in the case of acquiring a file by the line switching data communication. In the case that acquisition of plural files are intended on the basis of one HTML text body 263, it may be constructed so as to break a connection after making sure that the file to be acquired next is a file by the packet communication. Also, in this example, a size of a file to be acquired is requested one by one every file, but in the case of plural files to be acquired, it may be constructed so as to request sizes of these files at once and create a list of the size every file and calculate whether the respective files are acquired under any one of the charge systems in a cluster. In this case, files for making the line switching connection can be continuously requested and acquired, and a charge can be reduced further by avoiding waste of disconnecting or connecting a line every time the files are acquired.

Also, in the embodiment and the modified example, acquisition of data about the home page (contents) has been described but, for example, the present invention can be applied similarly to acquisition of electronic mail to which various files are attached. That is, also in this case, it may be constructed so that a communication channel is selected in consideration of the data format or a size of data, etc. when a mail text body acting as main data is acquired and accompanying data is acquired. Further, data can be sent similarly.

As described above, according to the present invention, it is constructed so as to determine a communication channel suitable for communication of accompanying data from information about the accompanying data written together in main data and conduct communication of the accompanying data while selecting the communication channel, so that the communication of the accompanying data can be conducted in a proper form. Also, the information about the accompanying data written together in the main data is used, so that the data necessary for the communication of the accompanying data can be acquired easily. Further, in the case of selecting the communication channel in which communication is conducted in a short time, the necessary data can be acquired in a short time regardless of circumstances of a line.

What is claimed is:

1. A mobile terminal for receiving data through wireless communication channels, the data including main data and accompanying data, the main data having written therein information about the accompanying data, said mobile terminal comprising:
   a main data acquisition part for acquiring the main data through a predetermined communication channel,
   an individual accompanying data communication channel determination part for determining, from a plurality of communication channels, including at least a packet communication channel and a line switching channel, a communication channel for receiving the accompanying data according to the information written in the acquired main data, and
   a communication channel selection part for selecting, from the plurality of communication channels, the communication channel determined by said individual accompanying data communication channel determination part, for receiving the accompanying data.

2. A mobile terminal as claimed in claim 1, wherein said individual accompanying data communication channel determination part determines the communication channel according to the amount of data in the accompanying data.

3. A mobile terminal as claimed in claim 1, wherein said individual accompanying data communication channel determination part determines the communication channel according to the communication time of the accompanying data.

4. A mobile terminal as claimed in claim 1, wherein the main data is acquired in a page description language, and the accompanying data comprises various configuration files specified by the page description language.

5. A mobile terminal as claimed in claim 1, wherein the main data comprises a text body of electronic mail, and the accompanying data comprises a file attached to the electronic mail.

6. A mobile terminal for sending and receiving data through wireless communication channels, the data including main data and accompanying data, the main data having written therein information about the accompanying data, said mobile terminal comprising:
   a main data communication channel selection part for selecting a communication channel for sending and receiving the main data,
   an individual accompanying data communication channel determination part for determining, from a plurality of communication channels, including at least a packet communication channel and a line switching channel, a communication channel for communication of the accompanying data according to the information written in the communicated main data, and
   an accompanying data communication channel selection part for selecting, from the plurality of communication channels, the communication channel determined by said individual accompanying data communication channel determination part.

7. A mobile terminal as claimed in claim 6, wherein said individual accompanying data communication channel determination part determines the communication channel according to the amount of data in the accompanying data.

8. A mobile terminal as claimed in claim 6, wherein said individual accompanying data communication channel determination part determines the communication channel according to the communication time of the accompanying data.

9. A method of receiving data through wireless communication channels, the data including main data and accompanying data, the main data having written therein information about the accompanying data, said method comprising:
   acquiring the main data through a predetermined communication channel;
   selecting, from a plurality of communication channels, including at least a packet communication channel and a line switching channel, a communication channel to receive the accompanying data based on the information written in the acquired main data; and
   receiving the accompanying data through the selected communication channel.

10. The method of claim 9, wherein the selected communication channel is selected based on the amount of data in the accompanying data.

11. The method of claim 9, wherein the selected communication channel is selected based on the communication time of the accompanying data.

12. A method of communicating data through wireless communication channels, the data including main data and accompanying data, the main data having written therein information about the accompanying data, said method comprising:
   selecting a main data communication channel for communicating the main data;
   communicating the main data through the main data communication channel;
   selecting, from a plurality of communication channels, including at least a packet communication channel and a line switching channel, an accompanying data communication channel to communicate the accompanying data based on the information written in the communicated main data; and
   communicating the accompanying data through the selected accompanying data communication channel.

13. The method of claim 12, wherein the accompanying data communication channel is selected based on the amount of data in the accompanying data.

14. The method of claim 12, wherein the accompanying data communication channel is selected based on the communication time of the accompanying data.

15. In a communication system comprising a plurality of wireless communication channels, including at least a packet communication channel and a line switching channel, a method of receiving data through the wireless communication channels, the data including main data and accompanying data, the main data having written therein information about the accompanying data, said method comprising:
   acquiring the main data through a predetermined one of the communication channels;
   based on the information written in the acquired main data, selecting one of the packet switching channel and the line switching channel to receive the accompanying data; and receiving the accompanying data through the selected communication channel.

16. In a communication system comprising a plurality of wireless communication channels, including at least a packet communication channel and a line switching channel, a method of communicating data through the wireless communication channels, the data including main data and accompanying data, the main data having written therein information about the accompanying data, said method comprising:

selecting one of the communication channels as a main data communication channel for communicating the main data;

communicating the main data through the main data communication channel;

based on the information written in the communicated main data, selecting one of the packet switching channel and the line switching channel as an accompanying data communication channel to communicate the accompanying data; and communicating the accompanying data through the selected accompanying data communication channel.

* * * * *